United States Patent
Ohashi (10) Patent No.: US 11,778,474 B2
(45) Date of Patent: Oct. 3, 2023

(54) SYSTEM AND NON-TRANSITORY COMPUTER READABLE STORAGE MEDIUM

(71) Applicant: KABUSHIKI KAISHA TOKAI RIKA DENKI SEISAKUSHO, Aichi (JP)

(72) Inventor: Yosuke Ohashi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 199 days.

(21) Appl. No.: 17/341,910

(22) Filed: Jun. 8, 2021

(65) Prior Publication Data
US 2022/0104024 A1 Mar. 31, 2022

(30) Foreign Application Priority Data
Sep. 28, 2020 (JP) .................................. 2020-161823

(51) Int. Cl.
| | |
|---|---|
| H04W 12/50 | (2021.01) |
| H04L 9/40 | (2022.01) |
| H04W 12/06 | (2021.01) |
| H04W 4/48 | (2018.01) |

(52) U.S. Cl.
CPC ......... *H04W 12/50* (2021.01); *H04L 63/0869* (2013.01); *H04W 4/48* (2018.02); *H04W 12/06* (2013.01)

(58) Field of Classification Search
CPC ....... H04W 12/50; H04W 4/48; H04W 12/06; H04L 63/0869; H04L 67/12
See application file for complete search history.

(56) References Cited

U.S. PATENT DOCUMENTS

| | | | |
|---|---|---|---|
| 2009/0183033 A1 | 7/2009 | Ando | |
| 2016/0219051 A1* | 7/2016 | Morita | ................ H04L 63/0869 |
| 2018/0126954 A1* | 5/2018 | Haga | ..................... B60R 25/307 |
| 2019/0238325 A1* | 8/2019 | Takemori | .................. H04L 9/14 |
| 2019/0342086 A1* | 11/2019 | Unagami | .............. H04L 9/0637 |
| 2021/0011709 A1* | 1/2021 | Itatsu | ..................... B60R 16/02 |
| 2021/0051000 A1* | 2/2021 | Yang | ......................... H04L 9/08 |
| 2021/0167988 A1* | 6/2021 | Harata | .................... H04L 67/06 |

FOREIGN PATENT DOCUMENTS

JP 2009-161148 7/2009

\* cited by examiner

*Primary Examiner* — Meng Li
*Assistant Examiner* — Lydia L Noel
(74) *Attorney, Agent, or Firm* — GREENBLUM & BERNSTEIN, P.L.C.

(57) ABSTRACT

A system comprising a plurality of pieces of equipment, wherein the equipment included in the system communicates with other equipment by using inter-equipment pairing information, the other equipment being included in the system, and the equipment and the other equipment mutually storing the inter-equipment pairing information, a part included in the equipment communicates with an other part by using inter-part pairing information, the part and the other part being included in the equipment that is identical, and mutually storing the inter-part pairing information, and when receiving a deletion request that is information that requests deletion of the inter-equipment pairing information, the system deletes the inter-equipment pairing information stored in each of the plurality of pieces of equipment, and maintains the inter-part pairing information stored in the part.

10 Claims, 4 Drawing Sheets

SYSTEM AND NON-TRANSITORY COMPUTER READABLE STORAGE MEDIUM

CROSS REFERENCE TO RELATED APPLICATION(S)

This application is based upon and claims benefit of priority from Japanese Patent Application No. 2020-161823, filed on Sep. 28, 2020, the entire contents of which are incorporated herein by reference.

BACKGROUND

The present invention relates to a system and a non-transitory computer readable storage medium.

In recent years, a system in which a plurality of pieces of equipment collaborate is spreading. There is an in-vehicle system as an example of such a system. In the in-vehicle system, control devices that are called Electronic Control Units (ECUs) are connected by an in-vehicle network such as a Controller Area Network (CAN), and perform various types of control related to a vehicle while communicating with each other.

As a technology that relates to an in-vehicle network, following JP2009-161148 discloses a technology that detects disconnection of a CAN network based on a communication error between ECUs connected by the CAN network.

SUMMARY

The system such as an in-vehicle system in which a plurality of pieces of equipment collaborate performs authentication between pieces of equipment for fraud prevention. It is demanded that a technology related to authentication between pieces of equipment is further improved.

Therefore, the present invention has been made in light of the above problem, and an object of the present invention is to provide a mechanism that makes it possible to further improve a technology related to authentication between pieces of equipment.

To solve the above described problem, according to an aspect of the present invention, there is provided a system comprising a plurality of pieces of equipment, wherein the equipment included in the system communicates with other equipment by using inter-equipment pairing information, the other equipment being included in the system, and the equipment and the other equipment mutually storing the inter-equipment pairing information that is information for mutual authentication performed between the equipment and the other equipment, a part included in the equipment communicates with an other part by using inter-part pairing information, the part and the other part being included in the equipment that is identical, and mutually storing the inter-part pairing information that is information for mutual authentication performed between the part and the other part, and when receiving a deletion request that is information that requests deletion of the inter-equipment pairing information, the system deletes the inter-equipment pairing information stored in each of the plurality of pieces of equipment, and maintains the inter-part pairing information stored in the part.

To solve the above described problem, according to another aspect of the present invention, there is provided a non-transitory computer readable storage medium having a program stored therein, the program causing a computer configured to control a system including a plurality of pieces of equipment to execute: causing the equipment included in the system to communicate with other equipment by using inter-equipment pairing information, the other equipment being included in the system, and the equipment and the other equipment mutually storing the inter-equipment pairing information that is information for mutual authentication performed between the equipment and the other equipment; causing a part included in the equipment to communicate with an other part by using inter-part pairing information, the part and the other part being included in the equipment that is identical, and mutually storing the inter-part pairing information that is information for mutual authentication performed between the part and the other part; and when the system receives a deletion request that is information that requests deletion of the inter-equipment pairing information, deleting the inter-equipment pairing information stored in each of the plurality of pieces of equipment, and maintaining the inter-part pairing information stored in the part.

As described above, the present invention provides a mechanism that makes it possible to further improve a technology related to authentication between pieces of equipment.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Further, in the present specification and the drawings, different alphabets are suffixed to a same reference numeral to distinguish elements which have substantially the same functional configuration. For example, a plurality of elements which have substantially the same functional configuration are distinguished such as equipment 10A, 10B, and 10C, as necessary. However, when there is no need in particular to distinguish elements that have substantially the same functional configuration, the same reference numeral alone is attached. For example, in the case where it is not necessary to particularly distinguish the equipment 10A, 10B, and 10C, the equipment 10A, 10B, and 10C are simply referred to as the equipment 10.

1. Configuration Example

Figure 1:
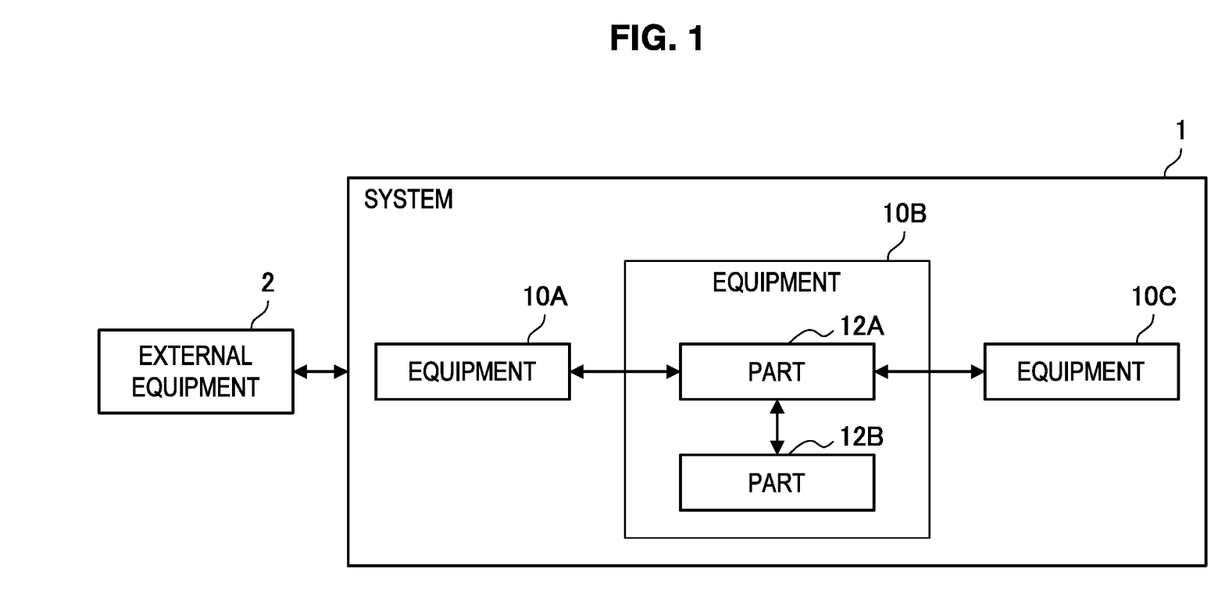
FIG. 1 is a block diagram illustrating an example of a configuration of a system according to an embodiment of the present invention.

FIG. 1 is a block diagram illustrating an example of a configuration of a system 1 according to an embodiment of the present invention. As illustrated in FIG. 1, the system 1 includes the plurality of pieces of equipment 10 (10A to 10C). The equipment 10B is connected with each of the equipment 10A and the equipment 10C.

The equipment 10 includes a function of communicating with the other pieces of equipment 10, and a function of executing various types of information processing. In one example, the system 1 may be an in-vehicle system that is a system mounted on a vehicle. In this case, the equipment 10 may be an ECU. Furthermore, the equipment 10 may execute various processes related to the vehicle. Furthermore, the pieces of equipment 10 are connected by, for example, a CAN network, and communicate via the CAN network.

As illustrated in FIG. 1, the equipment 10B may include a plurality of parts 12 (12A and 12B). The part 12A is a device that controls an entire operation of the equipment 10B. The part 12A communicates with the other pieces of equipment 10 (10A and 10C). Furthermore, the part 12A controls an operation of the part 12B that is the other part 12 in the equipment 10B. The part 12B operates based on control performed by the part 12A. The part 12A and the part 12B may be electronic circuits that make up, for example, an ECU. Although omitted in FIG. 1, the equipment 10A and the equipment 10C may also include the plurality of parts 12.

Note that, in this specification, processes described using the equipment 10B as a subject are executed by the part 12A unless mentioned in particular. The same applies to a case, too, where the equipment 10A and the equipment 10C include the plurality of parts 12. That is, processes executed by the equipment 10 are executed by the part 12 that controls the entire operation of the equipment 10 among the plurality of parts 12 included in the equipment 10 unless mentioned in particular.

As illustrated in FIG. 1, the system 1 is connected with external equipment 2. The external equipment 2 is a device that is not included in the system 1. The external equipment 2 is, for example, a tool for maintaining the system 1 that is the in-vehicle system.

2. Technical Feature (1) Pairing

—Inter-Equipment Pairing—

The equipment 10 communicates with the other equipment 10 by using inter-equipment pairing information, and the equipment 10 and the other equipment 10 mutually store the inter-equipment pairing information. The inter-equipment pairing information is information for mutual authentication performed between the equipment 10 and the other equipment 10. One example of the inter-equipment pairing information is an encryption key itself used at a time of mutual authentication. Another example of the inter-equipment pairing information is an algorithm for generating the encryption key used at the time of mutual authentication. Still another example of the inter-equipment pairing information is a seed that is source information for generating the encryption key used at the time of mutual authentication. Each of the equipment 10 and the other pieces of equipment 10 authenticates each other by using the stored inter-equipment pairing information, and then communicates.

In an example, each of the equipment 10A and the equipment 10B stores inter-equipment pairing information AB that is inter-equipment pairing information for mutual authentication performed between the equipment 10A and the equipment 10B. Furthermore, each of the equipment 10A and the equipment 10B communicates by using the stored inter-equipment pairing information AB. In another example, each of the equipment 10B and the equipment 10C stores inter-equipment pairing information BC that is inter-equipment pairing information for mutual authentication performed between the equipment 10B and the equipment 10C. Furthermore, each of the equipment 10B and the equipment 10C communicates by using the stored inter-equipment pairing information BC.

Pieces of inter-equipment pairing information stored between pairs of the different pieces of equipment 10 may be different from each other. For example, the inter-equipment pairing information AB and the inter-equipment pairing information BC may be different.

Thus, mutually storing the inter-equipment pairing information is also referred to as inter-equipment pairing. By performing inter-equipment pairing in advance, it is possible to allow only the pieces of equipment 10 that have performed the inter-equipment pairing to perform communication.

—Inter-Part Pairing—

The part 12 communicates with the other part 12 by using inter-part pairing information. The part 12 and the other part 12 are included in the identical equipment 10 and mutually store the inter-part pairing information. The inter-part pairing information is information for mutual authentication performed between the part 12 and the other part 12. An example of the inter-part pairing information is an encryption key itself used at a time of mutual authentication. Another example of the inter-part pairing information is an algorithm for generating the encryption key used at the time of mutual authentication. Still another example of the inter-part pairing information is a seed that is source information for generating the encryption key used at the time of mutual authentication. Each of the part 12 and the other parts 12 authenticates each other by using the stored inter-part pairing information, and then communicates.

In an example, each of the part 12A and the part 12B stores inter-part pairing information AB that is inter-part pairing information for mutual authentication performed between the part 12A and the part 12B. Furthermore, each of the part 12A and the part 12B communicates by using the stored inter-part pairing information AB.

The same process is performed in a case, too, where the equipment 10 includes the three or more parts 12. Pieces of inter-part pairing information stored between the different parts 12 may be different from each other.

Thus, mutually storing the inter-part pairing information is also referred to as inter-part pairing. By performing inter-part pairing in advance, it is possible to allow only the parts 12 that have performed the inter-part pairing to perform communication.

Note that, in a case where inter-equipment pairing and inter-part pairing do not need to be distinguished from each other, these inter-equipment pairing and inter-part pairing are also referred to simply as pairing. Furthermore, in a case where inter-equipment pairing information and inter-part pairing information do not need to be distinguished from each other, these inter-equipment pairing information and inter-part pairing information are also referred to simply as pairing information. That is, pairing refers to storing pairing information in advance. On the other hand, deleting pairing information is also referred to as impairing.

(2) Unpairing

When receiving a first deletion request, the system 1 deletes the inter-equipment pairing information stored in each of the plurality of pieces of equipment 10, and maintains the inter-part pairing information stored in the part 12. The first deletion request is information that requests deletion of the inter-equipment pairing information among deletion requests that are information that requests for deletion of pairing information. When, for example, receiving the first deletion request from the external equipment 2, the system 1 maintains the inter-part pairing information stored in each of the plurality of parts 12 in the equipment 10 without deleting the inter-part pairing information while deleting the inter-equipment pairing information stored in each of the equipment 10A to the equipment 10C.

Figure 2:
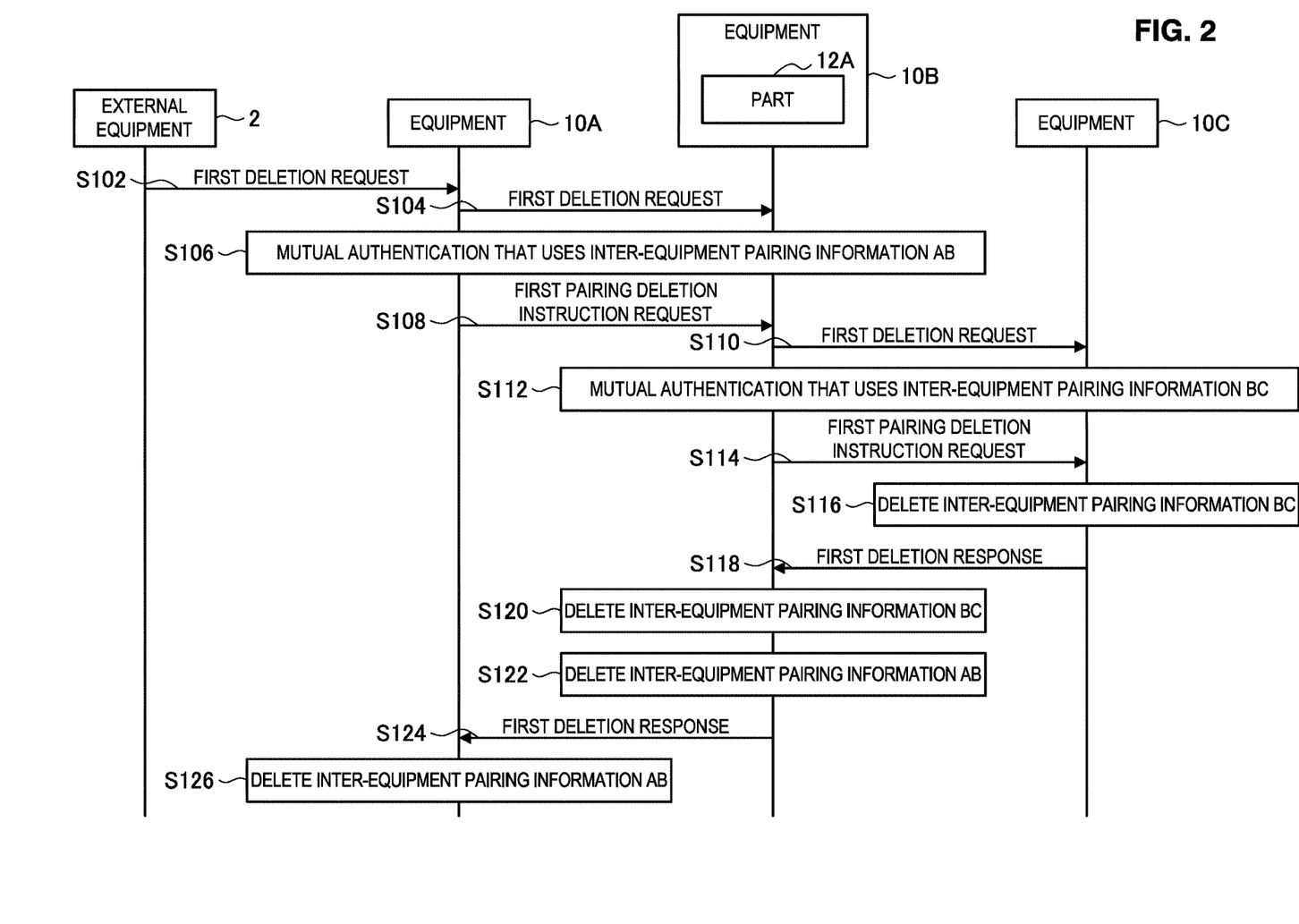
FIG. 2 is a sequence diagram illustrating an example of a flow of a process executed by the system according to the present embodiment.

A more specific process will be described with reference to FIG. 2. FIG. 2 is a sequence diagram illustrating an example of a flow of a process executed by the system 1 according to the present embodiment. The external equipment 2, the equipment 10A, the equipment 10B (more specifically, the part 12A) and the equipment C relate to this sequence.

As illustrated in FIG. 2, the external equipment 2 first transmits the first deletion request (step S102).

When receiving the first deletion request from the external equipment 2, the equipment 10A transmits the first deletion request to the equipment 10B that can communicate with the equipment 10A (step S104). Being able to perform communication described herein refers to that the pieces of equipment have been paired.

When the equipment 10B receives the first deletion request from the equipment 10A, the equipment 10B and the equipment 10A that is a transmission source of the first deletion request mutually authenticate each other by using the inter-equipment pairing information AB (step S106). According to this configuration, the equipment 10B can confirm whether or not the equipment 10A that is the transmission source of the first deletion request is a right paired communication party. In this case, it is assumed that the mutual authentication succeeds.

When succeeding in the mutual authentication that uses the inter-equipment pairing information AB, the equipment 10A transmits a first paring deletion instruction request to the equipment 10B (step S108). The first pairing deletion instruction request is information that instructs deletion of the inter-equipment pairing information among pairing deletion instruction requests that are information that instructs deletion of pairing information. The first pairing deletion instruction request can be also regarded as information for determining the first deletion request. Thus, by transmitting the first pairing deletion instruction request only in a case where mutual authentication succeeds, it is possible to improve security.

When receiving the first pairing deletion instruction request from the equipment 10A, the equipment 10B transmits the first deletion request to the equipment 10C that is the equipment 10 that can communicate with the equipment 10B (step S110). The equipment 10 that is able to perform communication described herein refers to the other equipment 10 that is other than the equipment 10A that is the transmission source of the first deletion request and has been paired with the equipment 10B.

When the equipment 10C receives the first deletion request from the equipment 10B, the equipment 10C and the equipment 10B that is the transmission source of the first deletion request mutually authenticate each other by using the inter-equipment pairing information BC (step S112). According to this configuration, the equipment 10C can confirm whether or not the equipment 10B that is the transmission source of the first deletion request is a right paired communication party. In this case, it is assumed that the mutual authentication succeeds.

When succeeding in the mutual authentication that uses the inter-equipment pairing information BC, the equipment 10B transmits the first paring deletion instruction request to the equipment 10C (step S114). Thus, by transmitting the first pairing deletion instruction request only in a case where mutual authentication succeeds, it is possible to improve security.

When receiving the first pairing deletion instruction request from the equipment 10B, the equipment 10C deletes the inter-equipment pairing information BC stored in the equipment 10C (step S116).

Furthermore, the equipment 10C transmits a first deletion response to the equipment 10B (step S118). The first deletion response is information that indicates that inter-equipment pairing information has been deleted among deletion responses that are information that indicates that pairing information has been deleted.

When receiving the first deletion response from the equipment 10C, the equipment 10B deletes the inter-equipment pairing information BC stored in the equipment 10B (step S120).

Next, after deleting the inter-equipment pairing information BC, the equipment 10B deletes the inter-equipment pairing information AB stored in the equipment 10B (step S122).

Furthermore, the equipment 10B transmits the first deletion response to the equipment 10A (step S124).

When receiving the first deletion response from the equipment 10B, the equipment 10A deletes the inter-equipment pairing information AB stored in the equipment 10A (step S126).

Note that, regarding the above-described flow of the process, the first deletion request becomes a starting point for the equipment 10 to be classified into one of first equipment to third equipment. That is, the equipment 10 that has received the first deletion request is the first equipment, the equipment 10 on an upstream of the first equipment (the transmission source of the first deletion request) is the second equipment, and the equipment 10 on a downstream of the first equipment (the transmission destination of the first deletion request from the first equipment) is the third equipment. Furthermore, inter-equipment pairing information for mutual authentication performed between the first equipment and the second equipment is first inter-equipment pairing information. Inter-equipment pairing information for mutual authentication performed between the first equipment and the third equipment is second inter-equipment pairing information.

Focusing on, for example, the first deletion request in step S102, the equipment 10A that has received the first deletion request is an example of the first equipment. The equipment 10B that is the transmission destination of the first deletion request from the equipment 10A in step S104 is an example of the third equipment. Furthermore, the inter-equipment pairing information AB is an example of second inter-equipment pairing information.

Focusing on, for example, the first deletion request in step S104, the equipment 10B that has received the first deletion request is an example of the first equipment. The equipment 10A that is the transmission source of the first deletion request in step S104 is an example of the second equipment. The equipment 10C that is the transmission destination of the first deletion request from the equipment 10B in step S110 is an example of the third equipment. Furthermore, the inter-equipment pairing information AB is an example of first inter-equipment pairing information. The inter-equipment pairing information BC is an example of second inter-equipment pairing information.

Focusing on, for example, the first deletion request in step S110, the equipment 10C that has received the first deletion request is an example of the first equipment. The equipment 10B that is the transmission source of the first deletion request in step S110 is an example of the second equipment. Furthermore, the inter-equipment pairing information BC is an example of first inter-equipment pairing information.

3. Effect

An effect of the system 1 according to the above-described present embodiment will be described below while describing a comparative example.

Figure 3:
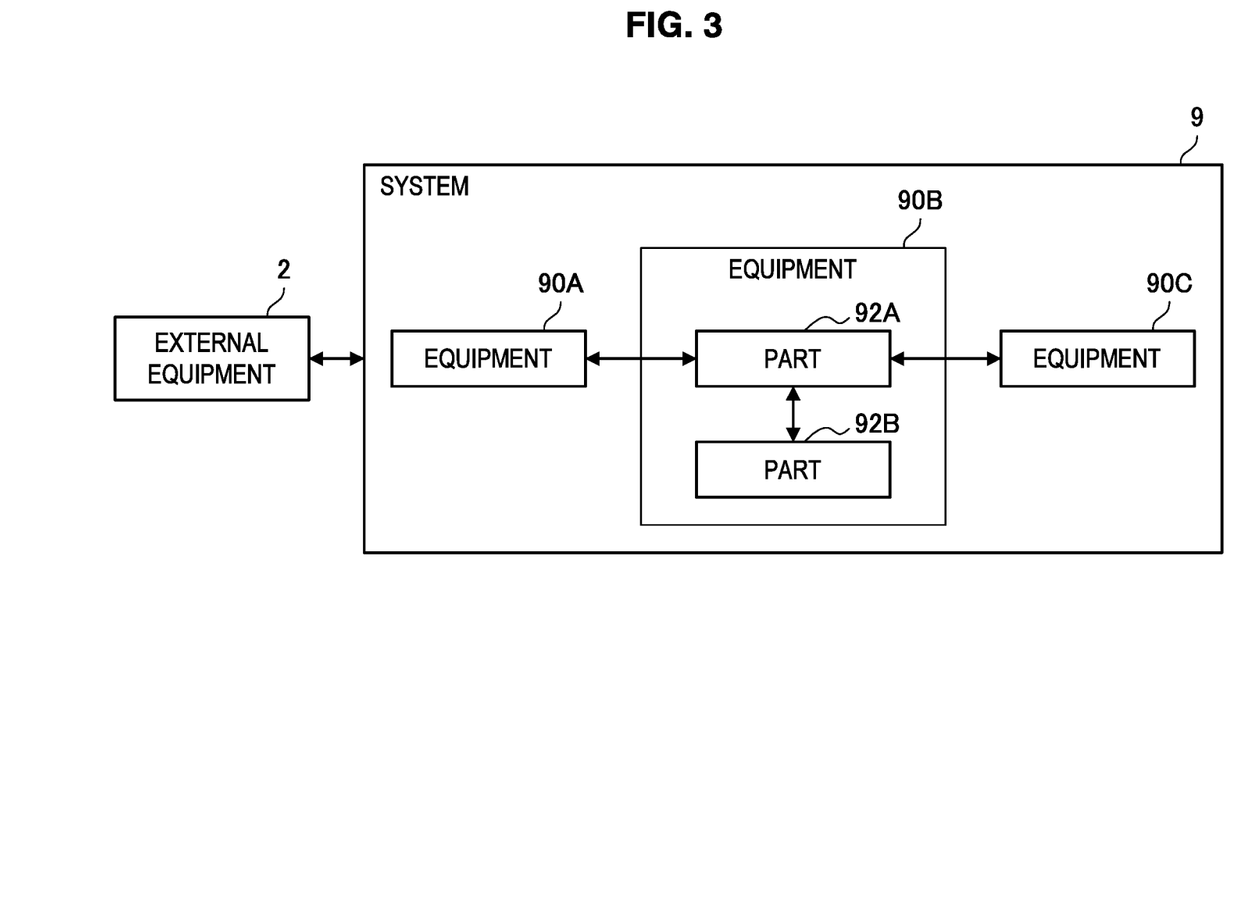
FIG. 3 is a block diagram illustrating an example of a configuration of a system according to a comparative example.

FIG. 3 is a block diagram illustrating an example of a configuration of a system 9 according to the comparative example. As illustrated in FIG. 3, the system 9 includes a plurality of pieces of equipment 90 (90A to 90C). The equipment 90B is connected with each of the equipment 90A and the equipment 90C. The equipment 90B includes a part 92A and a part 92B. Each component included in the system 9 includes the same configuration as each component included in the system 1.

In this regard, the system 9 according to the comparative example uses a second deletion request instead of the first deletion request that is information that requests deletion of inter-equipment pairing information. The second deletion request is information that requests deletion of both of inter-equipment pairing information and inter-part pairing information, i.e., all pieces of stored pairing information among deletion requests that are information that requests deletion of the pairing information. Hence, when receiving the second deletion request from the external equipment 2, the system 9 according to the comparative example deletes not only the inter-equipment pairing information, but also the inter-part pairing information. A more specific process of the system 9 according to the comparative example will be described with reference to FIG. 4.

Figure 4:
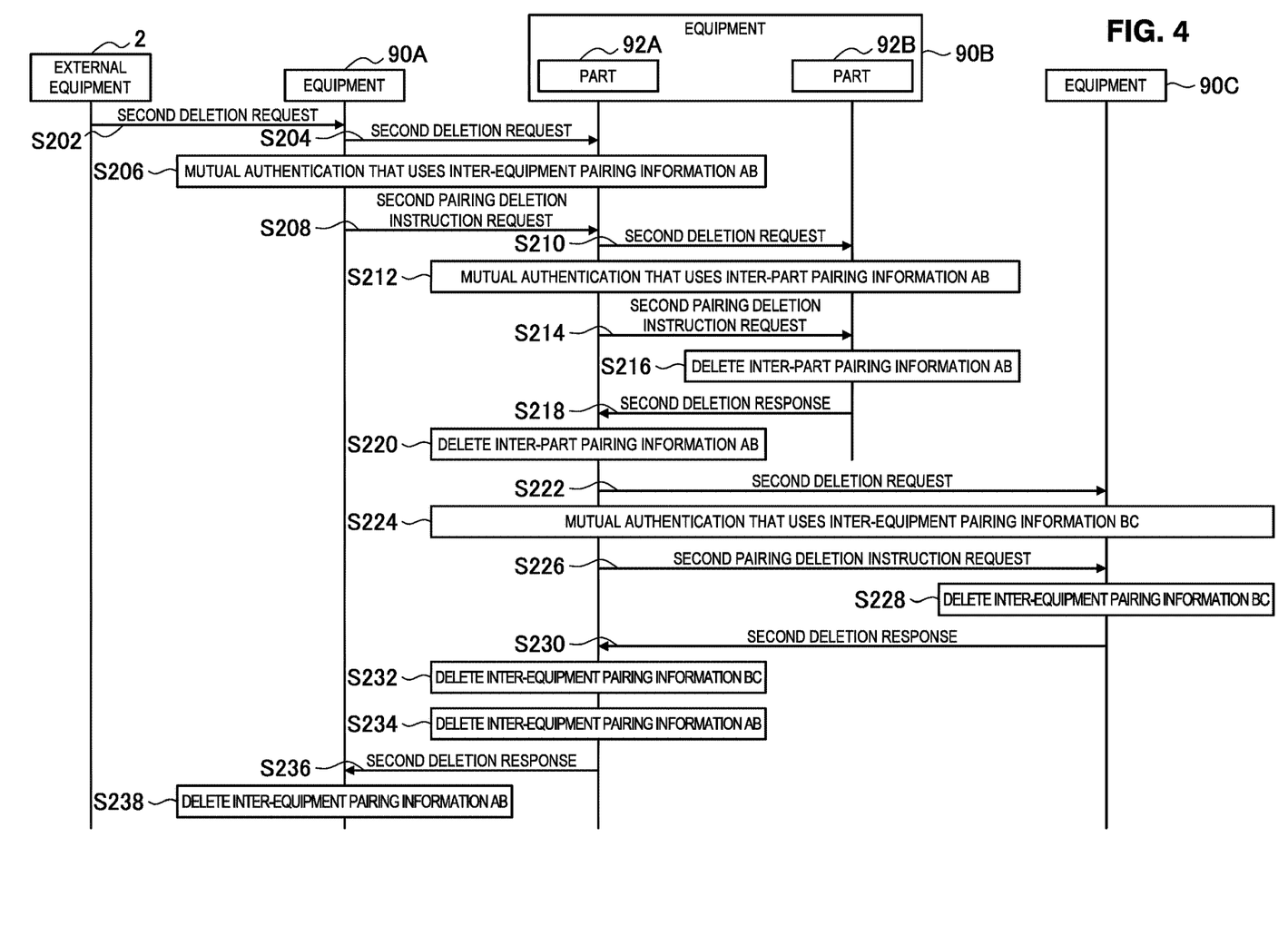
FIG. 4 is a sequence diagram illustrating an example of a flow of a process executed by the system according to the comparative example.

FIG. 4 is a sequence diagram illustrating an example of a flow of the process executed by the system 9 according to the comparative example. As illustrated in FIG. 4, the external equipment 2, the equipment 90A, the part 92A of the equipment 90B, the part 92B of the equipment 90B and the equipment 90C relate to this sequence.

As illustrated in FIG. 4, the external equipment 2 first transmits the second deletion request (step S202).

When receiving the second deletion request from the external equipment 2, the equipment 90A transmits the second deletion request to the equipment 90B that can communicate with the equipment 90A (step S204).

When the equipment 90B receives the second deletion request from the equipment 90A, the equipment 90B and the equipment 90A that is a transmission source of the second deletion request mutually authenticate each other by using the inter-equipment pairing information AB (step S206). In this case, it is assumed that the mutual authentication succeeds.

When succeeding in the mutual authentication that uses the inter-equipment pairing information AB, the equipment 90A transmits a second paring deletion instruction request to the equipment 90B (step S208). The second pairing deletion instruction request is information that instructs deletion of both of inter-equipment pairing information and inter-part pairing information, i.e., all pieces of stored pairing information among pairing deletion instruction requests that are information that instructs deletion of the pairing information. The second pairing deletion instruction request can be also regarded as information for determining the second deletion request.

When receiving the second pairing deletion instruction request from the equipment 90A, the part 92A of the equipment 90B transmits the second deletion request to the part 92B that is the part 92 that can communicate with part 92A in the equipment 90B (step S210). The part 92 that is able to perform communication described herein refers to the other part 92 that has been paired with part 92A in the equipment 90B.

When the part 92B receives the second deletion request from the part 92A, the part 92B and the part 92A that is the transmission source of the second deletion request mutually authenticate each other by using the inter-part pairing information AB (step S212). In this case, it is assumed that the mutual authentication succeeds.

When succeeding in the mutual authentication that uses the inter-part pairing information AB, the part 92A transmits the second paring deletion instruction request to the part 92B (step S214).

When receiving the second pairing deletion instruction request from the part 92A, the part 92B deletes the inter-part pairing information AB stored in the part 92B (step S216).

Furthermore, the part 92B transmits a second deletion response to the equipment 90B (step S218). The second deletion response is information that indicates that all pieces of stored pairing information have been deleted among deletion responses that are information that indicates that pairing information has been deleted.

When receiving the second deletion response from the part 92B, the part 92A deletes the inter-part pairing information AB stored in the part 92A (step S220).

Subsequently, the part 92A of the equipment 90B transmits the second deletion request to the equipment 90C that is the equipment 90 that can communicate with the equipment 90B (step S222). The equipment 90 that is able to perform communication described herein refers to the other equipment 90 that is other than the equipment 90A that is the transmission source of the second deletion request and has been paired with the equipment 90B.

When the equipment 90C receives the second deletion request from the equipment 90B, the equipment 90C and the equipment 90B that is the transmission source of the second deletion request mutually authenticate each other by using the inter-equipment pairing information BC (step S224). In this case, it is assumed that the mutual authentication succeeds.

When succeeding in the mutual authentication that uses the inter-equipment pairing information BC, the equipment 90B transmits the second paring deletion instruction request to the equipment 90C (step S226).

When receiving the second pairing deletion instruction request from the equipment 90B, the equipment 90C deletes the inter-equipment pairing information BC stored in the equipment 90C (step S228).

Furthermore, the equipment 90C transmits the second deletion response to the equipment 90B (step S230).

When receiving the second deletion response from the equipment 90C, the equipment 90B deletes the inter-equipment pairing information BC stored in the equipment 90B (step S232).

Next, after deleting the inter-equipment pairing information BC, the equipment 90B deletes the inter-equipment pairing information AB stored in the equipment 90B (step S234).

Furthermore, the equipment 90B transmits the second deletion response to the equipment 90A (step S236).

When receiving the second deletion response from the equipment 90B, the equipment 90A deletes the inter-equipment pairing information AB stored in the equipment 90A (step S238).

As described above, not only inter-equipment pairing but also inter-part pairing are unpaired in the system 9 according to the comparative example. On the other hand, only inter-equipment pairing is unpaired, and inter-part pairing is left in the system 1 according to the present embodiment.

The system 1 according to the present embodiment omits a process of unpairing inter-part pairing, so that it is possible to reduce a processing time compared to the system 9 according to the comparative example.

It is not basically assumed to exchange the parts 12 in the identical equipment 10, and therefore impairing inter-part pairing is an unnecessary process. In this regard, inter-part pairing is not unpaired and left in the system 1 according to the present embodiment, so that it is possible to remove the unnecessary process compared to the system 9 according to the comparative example.

Taking spoofing of the parts 12 into account, it can be said that security is higher in a case where inter-part pairing is not unpaired. In this regard, according to the present embodiment, even when inter-equipment pairing is unpaired, inter-part pairing is left, so that it is possible to improve security compared to the system 9 according to the comparative example. Spoofing the parts 12 refers to illegitimately exchanging the parts 12 with other parts. Furthermore, according to this configuration, it is possible to prevent inter-part pairing from being unpaired at a time of maintenance after manufacturing. In other words, it is possible to limit an inter-part pairing execution timing to a time of manufacturing of the system 1. Consequently, it is possible to further improve security.

There may be a case where a process is interrupted during the impairing process. In an example, the process is likely to be interrupted at a time when remaining battery lowers or due to noise. When, for example, the process is interrupted at a timing at which inter-part pairing information of only one of a pair of the parts 12 is deleted, the pair of parts 12 fail in mutually authenticating each other, and therefore it is forced to exchange the parts 12. Even in this case, at least inter-part pairing is not unpaired in the system 1, so that it is possible to avoid exchanging the parts 12.

4. Supplementary Explanation

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

The above embodiment has described the example where the system 1 is applied to the vehicle. However, the present invention is not limited to this example. For example, the system 1 may be applied to any devices such as smartphones, drones, houses and home appliances. Furthermore, each equipment 10 included in the system 1 may not be necessarily mounted on one device, and may be separately mounted on a plurality of devices.

The above embodiment has described the example where the system 1 includes the three pieces of equipment 10. However, the present invention is not limited to this example. The system 1 may include two or four or more pieces of the equipment 10. Similarly, the above embodiment has described the example where the equipment 10 includes the two parts 12. However, the present invention is not limited to this example. The equipment 10 may include three or more pieces of the equipment 10.

A mode that the plurality of pieces of equipment 10 included in the system 1 collaborate is arbitrary in the above embodiment. In an example, the system 1 may include a control device for controlling operations of the plurality of pieces of equipment 10. Each of the plurality of pieces of equipment 10 may operate based on control performed by the control device. In another example, one of the plurality of pieces of equipment 10 may function as the control device. In another example, each of the plurality of pieces of equipment 10 may function as the control device. That is, each of the plurality of pieces of equipment 10 may autonomously operate.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using the flowcharts and the sequence diagrams are not necessarily executed in the order illustrated in the drawings. Some processing steps may be executed in parallel. In addition, additional processing steps may be employed and some processing steps may be omitted.

| REFERENCE SIGNS LIST | |
|---|---|
| 1 | system |
| 10 | equipment |
| 12 | part |

What is claimed is:

1. A system, comprising:
    a plurality of pieces of equipment; and
    other equipment,
    wherein the plurality of pieces of equipment included in the system communicates with the other equipment by using inter-equipment pairing information, the other equipment being included in the system, and the plurality of pieces of equipment and the other equipment mutually storing the inter-equipment pairing information that is information for mutual authentication performed between the plurality of pieces of equipment and the other equipment,
    wherein a part included in the plurality of pieces of equipment communicates with an other part by using inter-part pairing information, the part and the other part being included in the plurality of pieces of equipment that is identical, and mutually storing the inter-part pairing information that is information for mutual authentication performed between the part and the other part, wherein a second equipment included in the plurality of pieces of equipment transmits to a first equipment included in the plurality of pieces of equipment a pairing deletion instruction request that is information that instructs deletion of the inter-equipment pairing information, and when receiving a deletion request that is information that requests deletion of the inter-equipment pairing information, the system unpairs between the plurality of pieces of equipment by deleting the inter-equipment pairing information stored in each of the plurality of pieces of equipment, and maintains pairing between the plurality of pieces of the part by maintaining the inter-part pairing information stored in the part.

2. The system according to claim 1, wherein, when the first equipment that is included in the plurality of pieces of equipment included in the system receives the deletion request from the second equipment that is included in the plurality of pieces of equipment included in the system, the first equipment and the second equipment mutually authenticate each other by using first inter-equipment pairing information that is the inter-equipment pairing information for the mutual authentication performed between the first equipment and the second equipment.

3. The system according to claim 2, wherein, when receiving the pairing deletion instruction request from the second equipment, the first equipment deletes the first inter-equipment pairing information stored in the first equipment, and transmits to the second equipment a deletion response that is information that indicates that the inter-equipment pairing information has been deleted.

4. The system according to claim 2, wherein, when receiving the pairing deletion instruction request from the second equipment, which had received the deletion request from an equipment other than the first equipment, the first equipment transmits the deletion request to a third equipment that is the equipment included in the system and can communicate with the first equipment.

5. The system according to claim 4, wherein, when receiving from the third equipment a deletion response that is information that indicates that the inter-equipment pairing information has been deleted, the first equipment deletes second inter-equipment pairing information that is stored in the first equipment and is the inter-equipment pairing information for mutual authentication performed between the first equipment and the third equipment.

6. The system according to claim 5, wherein, after deleting the second inter-equipment pairing information, the first equipment deletes the first inter-equipment pairing information that is stored in the first equipment and is the inter-equipment pairing information for the mutual authentication performed between the first equipment and the second equipment.

7. The system according to claim 6, wherein the first equipment transmits to the second equipment the deletion response that is information that indicates that the inter-equipment pairing information has been deleted.

8. The system according to claim 1, wherein, when receiving the deletion request from external equipment that is not included in the system, first equipment that is the equipment included in the system transmits the deletion request to third equipment that is the equipment included in the system and can communicate with the first equipment.

9. The system according to claim 8, wherein, when receiving from the third equipment a deletion response that is information that indicates that the inter-equipment pairing information has been deleted, the first equipment deletes second inter-equipment pairing information that is stored in the first equipment and is the inter-equipment pairing information for mutual authentication information performed between the first equipment and the third equipment.

10. A non-transitory computer readable storage medium having a program stored therein, the program causing a computer configured to control a system including a plurality of pieces of equipment to execute:

causing the plurality of pieces of equipment included in the system to communicate with other equipment by using inter-equipment pairing information, the other equipment being included in the system, and the plurality of pieces of equipment and the other equipment mutually storing the inter-equipment pairing information that is information for mutual authentication performed between the plurality of pieces of equipment and the other equipment;

causing a part included in the plurality of pieces of equipment to communicate with an other part by using inter-part pairing information, the part and the other part being included in the plurality of pieces of equipment that are identical, and mutually storing the inter-part pairing information that is information for mutual authentication performed between the part and the other part;

causing a second equipment included in the plurality of pieces of equipment to transmit to a first equipment included in the plurality of pieces of equipment a pairing deletion instruction request that is information that instructs deletion of the inter-equipment pairing information, and when the system receives a deletion request that is information that requests deletion of the inter-equipment pairing information, the system unpairs between the plurality of pieces of equipment by deleting the inter-equipment pairing information stored in each of the plurality of pieces of equipment, and maintaining pairing between the plurality of pieces of the part by maintaining the inter-part pairing information stored in the part.

* * * * *